US005794173A

United States Patent [19]
Schütte

[11] Patent Number: 5,794,173
[45] Date of Patent: Aug. 11, 1998

[54] METHOD AND APPARATUS FOR OPTIMIZATION OF AN ALLOCATION MATRIX IN DETERMINING SOLUTIONS OF THE ASSOCIATION PROBLEM IN THE COURSE OF TRACKING SEVERAL MOVING OBJECTS

[75] Inventor: Andreas Schütte, Berlin, Germany

[73] Assignee: Daimler-Benz Aktiengesellschaft, Stuttgart, Germany

[21] Appl. No.: 549,486

[22] Filed: Oct. 27, 1995

[30] Foreign Application Priority Data

Oct. 28, 1994 [DE] Germany .................. 44 39 742.9

[51] Int. Cl.[6] .......................... G06F 17/10; G08G 5/04
[52] U.S. Cl. .................................. 701/205; 342/90
[58] Field of Search .......................... 364/516, 517, 364/447; 342/90, 96; 701/205

[56] References Cited

U.S. PATENT DOCUMENTS

| 4,931,952 | 6/1990 | Hyder | 364/517 |
|---|---|---|---|
| 5,202,691 | 4/1993 | Hicks | 342/90 |
| 5,390,133 | 2/1995 | Sohie | 364/516 |
| 5,406,289 | 4/1995 | Barker et al. | 342/96 |
| 5,491,645 | 2/1996 | Kenndy et al. | 364/516 |
| 5,537,119 | 7/1996 | Poore, Jr. | 342/96 |

OTHER PUBLICATIONS

Barry E. Fridling et al, "Performance evaluation methods for multiple target tracking algorithms," Signal and Data Processing of Small targets, SPIE vol. 1481(1991), pp. 371–383.

Meir J. Rosenblatt et al, "A distance assignment approach to the facility layout problem," European Journal of Operational Research, vol. 57, (1992) pp. 253–270.

Somnath Deb et al, "A S-dimensional Assignment Algorithm for Track Initiation," IEEE International Conference on Systems Engineering (1992), pp. 527–530.

Pei-yih Ting et al, "Multitarget Motion Analysis in a DSN", IEEE Transaction on Systems, Man and Cybernetics, vol. 21, No. 5, (1991), pp. 1125–1139.

S. Bruder et al, "A NN Type Multi-Sensor Tracking and Identification Algorithm," Proceedings of the 36th Mid-West Symposium on Circuits and Systems (1993), pp. 492–495.

*Primary Examiner*—Michael Zanelli
*Attorney, Agent, or Firm*—Spencer & Frank

[57] ABSTRACT

In optimization of combinatory optimization problems, it is possible to perform deterministic as well as more or less randomized searches. A new allocation matrix is generated, based on a more or less coincidentally selected, but valid allocation matrix. A check is made thereafter whether it constitutes a better solution than the old allocation matrix. If this is the case, this matrix is used as the new starting point for the further search. If this is not the case, the old allocation matrix is kept as the starting point for the further search. This process is continued until the time made available for the solution has expired, or until it is determined by the method itself that no better solution can be found in the course of the instantaneously realized search.

17 Claims, 2 Drawing Sheets

FIG. 1a

|  | $O_1$ | $O_2$ | $O_3$ | $O_4$ |
|---|---|---|---|---|
| T1 | $d_{11}$ | $d_{12}$ | $d_{13}$ | $d_{14}$ |
| T2 | $d_{21}$ | $d_{22}$ | $d_{23}$ | $d_{24}$ |
| T3 | $d_{31}$ | $d_{32}$ | $d_{33}$ | $d_{34}$ |
| T4 | $d_{41}$ | $d_{42}$ | $d_{43}$ | $d_{44}$ |

FIG. 1b

|  | $O_1$ | $O_2$ | $O_3$ | $O_4$ |
|---|---|---|---|---|
| T1 | 0 | 1 | 0 | 0 |
| T2 | 0 | 0 | 0 | 1 |
| T3 | 0 | 0 | 1 | 0 |
| T4 | 1 | 0 | 0 | 0 |

METHOD AND APPARATUS FOR OPTIMIZATION OF AN ALLOCATION MATRIX IN DETERMINING SOLUTIONS OF THE ASSOCIATION PROBLEM IN THE COURSE OF TRACKING SEVERAL MOVING OBJECTS

CROSS-REFERENCE TO RELATED APPLICATION

The present disclosure relates to the subject matter disclosed in German Application No. P 44 39 742.9 of Oct. 28, 1994, the entire specification of which is hereby incorporated herein by reference.

BACKGROUND OF THE INVENTION

1. Field of The Invention

The invention relates to a method, and an apparatus for implementing the method, for the automatic combinatory optimization of the association of individually, previously calculated positions of objects in a first group, with the individual actually observed positions of objects in a second group, particularly useful for tracking several moving objects.

2. Background Information

A known method in this field is described in Samuel S. Blackman, "Multiple-Target Tracking with Radar Applications," published by Artech House, Norwood, Mass., 1986, pages 92 to 101.

The association problem when tracking several moving objects is basically an allocation, or assignment problem, and is represented as follows:

It is intended to assign M elements $O_j$ (j=1 to M) from group 2 to N elements $T_i$ (i=1 to N) from group 1. It is also intended to assign to each element of the group with a lesser number of elements, exactly one element of the other group. Further, each element of the group with the larger number of elements may be optimally assigned to one element of the other group.

The allocation problem is stated by a matrix of values, referred to hereinafter as "costs" $d_{ij}$. Thus, pairings of $T_i$ with $O_j$ are associated with the costs $d_{ij}$, as illustrated in FIG. 1a. A pairing of $T_i$ and $O_j$ may be identified in the allocation matrix by a one (1), that is, as the value 1 at a position (i,j), where i represents a row number and j represents a column number. The solution to the allocation problem is described by the allocation matrix.

In the allocation matrix, for a valid assignment, i.e. consistent and complete, it is necessary that for N≦M, there be exactly N ones (1's), and for M≦N exactly M ones (1's), where a one (1) appears no more than once in each column and row of the allocation matrix, as illustrated in FIG. 1b.

An allocation matrix is sought containing those pairings wherein the total costs (sum of the corresponding $d_{ij}$) associated with these pairings are minimal. All selected pairings represent the allocation (assignment).

An assignment is considered to be incomplete if only L pairings (where L<min(N, M)) are permitted to appear. In connection with multiple target tracking, that is, the tracking of a plurality of moving objects, as an example of a technical application, in the search for a solution of the association problem, this can be the case, for example, when the detection probability of the objects is significantly less than one.

An example for a 4×4 problem (N=M=4) of a bipartite association (matching) is illustrated in FIGS. 1a and 1b. A cost matrix with the costs $d_{11}$ to $d_{44}$ in the allocation of the elements $T_1$ to $T_4$ to the elements $O_1$ to $O_4$, is shown in FIG. 1a.

In the course of tracking the path of several moving objects, i.e., multiple target tracking, for example, such a cost matrix is called a "distance matrix," where the costs are understood to be the squared distances (error) between the actual position (measured) of a moving object and a predicted position, i.e., a predetermined position based on a predicted track of the object.

In other words, the cost matrix, a distance matrix, in this technical application of the association problem, indicates how far the individual objects deviate from the pre-calculated (predicted) positions of these objects.

An allocation matrix is sought, that first the assignment represented by the allocation matrix is valid and second the ones in the allocation matrix are located at these places (i, j) so that the total sum of the corresponding costs $d_{ij}$ (squared distances) in the cost matrix becomes as minimal as possible.

In multiple target tracking of moving objects, for example in air space monitoring or collision prevention by means of an optimal predetermination of the tracks of the moving objects, it is often necessary to solve the association problem with a sufficiently high quality and in a very short time, i.e. under "real-time" requirements.

However, in the case of real-time requirements the optimal (exact) solution of the association problem, for example by means of the Munkres algorithm described in the above-mentioned document, is too elaborate. In these cases, a method is needed which represents the best possible compromise between the quality of the solution found, and the amount of time required to find the solution.

There are a number of known optimal and sub-optimal methods for the solution of the association problem in the field of multiple target tracking. Some of the most important of these known methods include an application of the Munkres algorithm to the distance matrix (e.g., Blackman in loc. cit.), an application of the next neighbor method (a Greedy algorithm) to the distance matrix (see Blackman in loc. cit. "Suboptimal Solution Two"), an application of the simplified closest neighbor method to the distance matrix (see Blackman in loc. cit. "Suboptimal Solution One") , calculation of the "cheap" JPDA matrix as a new cost matrix from the distance matrix and application of the previously mentioned simplified next neighbor method to this "cheap" JPDA matrix (see Bar-Shalom, "Multi-Target-Multisensor Tracking", publ. by Artech House, Norwood, Mass., 1990, pp 1 to 23), calculation of an improved suboptimal JPDA matrix as a new cost matrix from the distance matrix and application of the next neighbor method to this "cheap" JPDA matrix (see Roecker, "Suboptimal Joint Probabilistic Data Association" in IEEE Transactions on Aerospace and Electric Systems, vol. 29, No. 2, April 1993, pp. 510 to 516), an application of feedback neural networks, such as for example the Hopfield network (see Sengupta and Iltis, "Neural Solutions to the Multitarget Tracking Data Association Problem" in IEEE Transactions on Aerospace and Electric Systems, vol. AES-25, No. 1, January 1989, pp. 96 to 108) or other network structures (see Eberhardt et al., "Competitive Neural Architecture for Hardware Solutions to the Assignment Problem" in "Neural Networks", vol. 4, 1991, pp 431 to 442), where a dynamic system is structured, put into parameters and initialized in such a way that the position of rest, which with great probability is the end point of the inherent dynamics of the system, represents the solution of the association problem, and an application of cellular stochastic networks (see, for example, EP 0 362 864 A3), wherein a process similar to simulated annealing (see Kirkpatrick et al., "Optimization by Simulated Annealing" in "Science", vol. 220, No. 4598, 1983, pp. 5 to 14) is realized.

However, the above-mentioned methods, and similar methods for solving the association problem within the framework of the multiple target tracking problem, either have the disadvantage that they take too much time to find solutions and cannot, therefore, meet the real-time requirements, or that the solutions provided are not of the required quality.

An immediate result of these disadvantages is insufficient path tracking, and this applies all the more, the more difficult the association problem, for example, with the multiple target tracking problem, where more and more objects must be simultaneously tracked under increasingly difficult conditions, e.g., reduced probability of detection of the objects, high object density and increase rate of false alarms.

Although the Munkres method is exact, solving the problem to achieve the best possible solution, for large problems, it is too elaborate and, therefore, time consuming. By contrast, the simplified closest neighbor method is a very quick method whose solutions, however, are not always of sufficient quality.

It is also noted, in connection with the solution of the problem by means of neural networks, that such methods can only have a good chance of meeting real-time requirements if the neural network structures are realized by means of analog hardware circuits. However, such analog circuits are not commercially available at present.

It should be also noted that the dynamic behavior regarding the stability of such neural networks is not yet satisfactory. In connection with complicated association constellations, the neural network relaxation process often does not terminate in a position of rest, constituting the solution of the problem, but rather results in a limit cycle. In these cases, no solution can be indicated.

On the other hand, it is impossible with more complex constellations to easily "read out" the allocation matrix from the state of the position of rest. In these situations the application of the simplified closest neighbor method, for example, again becomes necessary. Although solutions of high quality are found in this way, it is necessary to make available an increased numerical outlay, for example, for the simplified closest neighbor system.

Something similar to the application of neural networks, applies to the application of the cellular stochastic networks, mentioned above. As with neural networks, hardware implementation in analog circuit technology becomes necessary to meet real-time requirements, which, for larger problems, is only possible by means of VLSI technology, not available at present. Furthermore, the hardware layout is very large considering that, of all N×M "processing cells" per cycle, there is always only exactly one active.

In the method known from EP 0 362 874 A3 there is no parallelism of operation, which is otherwise usual in networks, of the "processing cells" in the "cellular network". Furthermore, the treatment of association problems where N≠M, or with incomplete assignment, is not possible without an additional preparation effort.

Therefore, there has existed a need for an improved way of solving the association problem when tracking several moving objects which is capable of providing real-time solutions of a high quality.

SUMMARY OF THE INVENTION

It is, therefore, an object of the present invention to overcome the above-mentioned problems in the known methods.

It is the object of the invention to provide a method which can meet the real-time requirements inherent in its application to multiple object tracking, using currently available technology, i.e., hardware devices, without a degradation in the quality of the results.

It is a further object of the invention to provide a way of solving non-symmetrical association problems, which may occur as described above in connection with methods in this field, and problems relating to incomplete assignment (allocation).

These and other objects are attained in accordance with the invention by means of a computer implemented method for automatic combinatory optimization of an association of individually, predicted positions of objects as the first group with the individual actually observed positions of these objects as the second group, in a system for tracking several moving objects. In particular, by generating any arbitrary matrix meeting the marginal conditions as a valid start allocation matrix, selecting two lines (two rows or two columns) from the start allocation matrix and interchanging the respective 1's between corresponding columns in the lines creating a new allocation matrix, forming a first sum using the two distance values which are located in the distance matrix corresponding to the two selected lines at the respective positions determined by the respective 1's before being interchanged, forming a second sum using the two distance values which are located in the distance matrix corresponding to the two selected lines at the respective positions determined by the respective 1's after being interchanged, forming a quality difference value as the difference between the first and second sums, comparing the quality difference value with a predetermined threshold value, using the new allocation matrix as a present valid allocation matrix if the quality difference value is less than the threshold value, but otherwise using the old allocation matrix as the present valid allocation matrix, and repeating the above steps until a predetermined period of time has elapsed, or until all interchange possibilities between two lines of the allocation matrix have been exhausted, or until after a set number of comparisons it being determined that no better allocation matrix has been found.

In comparison with the known methods, in a software implementation in a digital computer, for example, the method according to the present invention is the fastest method, next to the simplified next neighbor method, for solving the association problem. This also applies for an implementation of the present invention in a special purpose digital processor, or special purpose analog circuits, realized in CMOS-VLSI hardware, for example.

The method in accordance with the present invention is a search method, and therefore it is practical to start the search from a favorable starting point, i.e., with a favorable allocation matrix. The use of the simplified next neighbor method is particularly suited as a method for calculating a favorable starting constellation for the allocation matrix, i.e., the start allocation matrix. Some simulated calculations show that in connection with more complex association problems, e.g., problem size 30×30 and maneuvering objects, it is superior to all the previously mentioned methods in respect to the association quality, producing generally very good solutions, with no stability problems.

Thus, the advantages of the method in accordance with the invention consist in a drastic improvement of the association quality simultaneously with a comparatively very small numerical/hardware effort, which in particular results in a considerable improvement in the solution of the association problem where high real-time demands must be taken into consideration.

Some reasons for the efficiency and applicability of the method according to the present invention are as follows:

(1) It is possible to employ the results of very fast existing methods (e.g., simplified next neighbor) for determining a good start allocation matrix.

(2) By means of the method for generating new allocation matrices, only those are generated which a priori represent a valid assignment.

(3) By means of the selection of a suitable quality comparison value ($\equiv$o), only those solutions are newly found which are better than the start allocation matrix.

(4) Address generation can be adapted to the problem by the use of different, more or less randomized or deterministic address generating options for line selection for exchanging places occupied by the value 1. If already relatively good start allocation matrices are made available, for example by means of the simplified closest neighbor method, deterministic address generation methods in particular are efficient.

(5) The method allows an extremely simple calculation of the quality differences (distance differences) between the allocation matrix, which is the instantaneous starting point of the search, and the newly generated allocation matrix. The automatic search for a better solution advantageously only includes the interchange of two ones in the allocation matrix per search step, as well as two additions, one subtraction and one comparison, so that relatively little calculating time is required.

(6) The treatment of asymmetric problems ($N \neq M$), and problems with incomplete assignment, are directly possible (the number of ones in the start allocation matrix does not change during processing by means of the described search method).

The method in accordance with the invention will be described below by means of an example, making reference to the attached drawings.

The method according to the invention may be implemented by suitably programming a digital computer, for example, or by the provision of special purpose circuitry. An apparatus for carrying out the invention includes first memory means for storing an allocation matrix, second memory means for storing a distance matrix, the distance matrix formed from a pairing of values from a first group of values representing previously calculated object positions and a second group of values representing actual observed object positions, the distance values representing the squared distance between the respective paired values, wherein, in the allocation matrix, a value of 1 represents a distance value in a corresponding row and column of the distance matrix, so that there is only a single 1 in a given row and column of the allocation matrix, first and second address generator means for generating first and second addresses, the first and second addresses each being provided to the first and second memory means, wherein the first memory means outputs third addresses in response to the providing of the first and second addresses thereto, and provides the third addresses to the second memory means, and wherein the second memory means outputs distance values in response to the providing of the first, second and third addresses thereto, arithmetic combining means for arithmetically combining the distance values output from the second memory means and producing a delta value, threshold generator means for generating a threshold value, and comparing means for comparing the threshold value with the delta value and producing a comparison signal indicative of whether the delta value is less than the threshold value, wherein if the comparison signal indicates the delta value is less than the threshold value, the allocation matrix in the first memory means is changed by interchanging rows columns thereof corresponding to the first and second addresses.

BRIEF DESCRIPTION OF THE DRAWINGS

The above and other features and objects of the invention will become apparent from the following detailed description taken with the drawings in which:

FIG. 1a is a representation of a cost matrix;

FIG. 1b is a representation of an allocation matrix; and

DETAILED DESCRIPTION OF THE PREFERRED EMBODIMENTS

Figure 2:
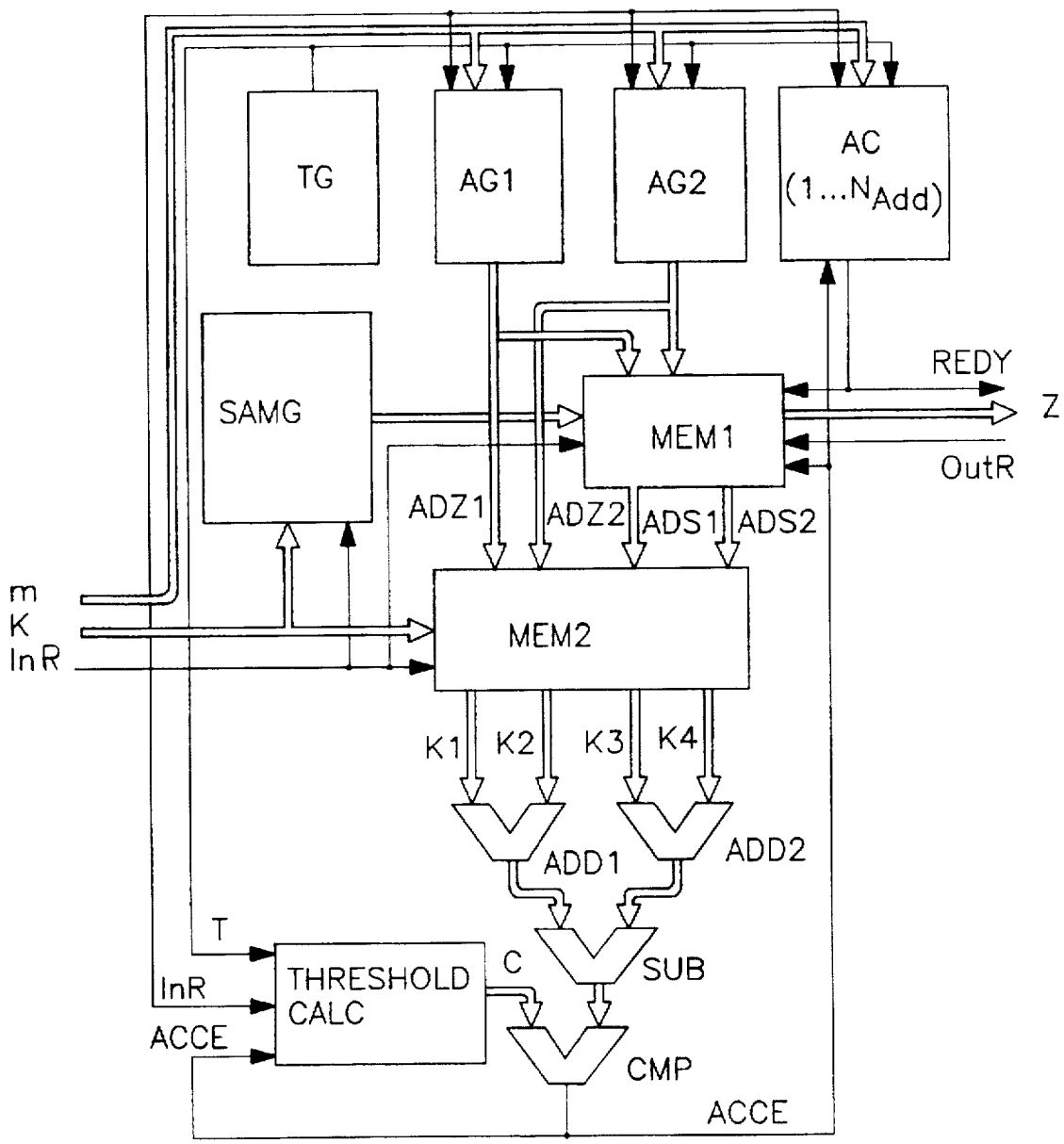
FIG. 2 is a block circuit diagram of an apparatus in which a method is implemented for carrying out the invention.

The invention will now be described in more detail by example, with reference to the embodiments described below and shown in the Figures. It should be kept in mind that the following described embodiments are only presented by way of example and should not be construed as limiting the inventive concept to any particular physical hardware configuration or process steps.

FIG. 2 is a functional block diagram representation of the invention, e.g., an apparatus for carrying out or implementing the method. As already mentioned, and as would be readily apparent to one skilled in the art, the invention could be implemented in a computer programmed to perform the method, or in a special purpose hardware device, and therefore, it should be remembered that the functional block diagram of FIG. 2 is presented as a representation of the functions performed in carrying out the invention.

Shown in the functional block diagram of FIG. 2 are a cycle generator block TG, two address generator blocks AG1, AG2, an address counter block AC, a start allocation matrix generator block SAMG for the initial presentation of a start allocation matrix (a start constellation of the allocation matrix), a first memory block MEM1 for storing the respectively valid allocation matrix, a second memory block MEM2 for storing a distance matrix, computing circuitry including two adder blocks ADD1, ADD2 and a downstream located subtractor block SUB, a comparator block CMP, and a THRESHOLD CALC circuit block for calculating a quality comparison value, i.e., a threshold value.

The elements illustrated in FIG. 2 cooperate as will now be described in accordance with the method of the invention.

When an input request signal InR is activated, a predefined matrix K is placed into memory MEM2 for the distance matrix, and address counter AC is reset. The actual value of the dimension "m" which corresponds to the greatest value of the number of rows and columns of the distance matrix K, is received by address generators AG1, AG2 and address counter AC. The maximum possible number of addresses $N_{Add}$ is calculated as a function of this problem value "m" in address counter AC. If in the course of a search (as described below) this number of addresses $N_{Add}$ is reached, a signal REDY is issued from the address counter AC and indicates that a further search cannot provide a better solution because all search possibilities have been exhausted.

At the same time, the start allocation matrix generator SAMG begins to calculate an allocation matrix which is to be used as the starting point of the search. In the simplest case this can be any arbitrary valid allocation matrix which does not depend on the contents of the actual distance matrix. However, it is also possible to use a better starting matrix, for example, by generating the start allocation matrix with start allocation matrix generator SAMG using the simplified closest neighbor method. Along with the subsequent inactivation of input request signal InR, the determined start allocation matrix is transferred from start allocation matrix generator SAMG into the first memory MEM1 and the process of searching for the optimal allocation matrix is started.

With each new cycle signal (T) provided by cycle generator TG, address generators AG1 and AG2 deliver two new addresses ADZ1 (T) and ADZ2 (T) for two rows of the allocation matrix which, if the rows were interchanged, would constitute a new allocation matrix (variation operator of the search method). Memory MEM1 having the allocation matrix then issues addresses ADS1 (T) and ADS2 (T). These indicate in which columns the value 1 in the two addressed rows of the allocation matrix is located. It should be noted here that the part played by the row and column can be interchanged in general.

If the four addresses ADZ1, ADZ2, ADS1 and ADS2 are present in memory MEM2 having the distance matrix K, the four cost values at the addressed locations, namely K1=K (ADZ1, ADS1), K2=K (ADZ2, ADS2), K3=K (ADZ1, ADS2) and K4=K (ASZ2, ADS1), are output from memory MEM2 to downstream computing circuitry ADD1, ADD2 and SUB.

The computing circuitry ADD1, ADD2 and SUB calculates a value $\Delta=((K1+K2)-(K3+K4))$. This value represents the quality difference between the old allocation matrix and the new allocation matrix (1's interchanged).

It is noted here that in this method, in contrast to many other methods, a complete calculation of the quality of the two allocation matrices to be compared is not required for the calculation of the quality difference $\Delta$. In the method in accordance with the invention it is possible, based on the variation operator employed here, to progress with only the calculation of the expression $((K1+K2)-(K3+K4))$, i.e., with only two additions and one subtraction.

The determined quality difference $\Delta$ is now compared in comparator CMP with a threshold value "c" provided by the THRESHOLD CALC circuit block as the quality comparison value. If the requirement $((K1+K2)-(K3+K4))<c$ is met, a signal ACCE is emitted by the comparator CMP causing the values of the two rows (or two columns) in the allocation matrix of MEM1 addressed by ADZ1 (T) and ADZ2 (T) to be interchanged in memory MEM1, and the address counter AC to be reset. In this case, a new allocation matrix is obtained by the two-row (or two-column) interchange of the value 1, and is subsequently used as the starting point of the continued search process, starting with the following cycle (T=1), the address counter again starting to count the addresses to be provided.

In the course of the process, a new allocation matrix for the quality comparison value $c(T)\equiv 0$ is always kept in memory MEM1 at exactly the moment when it represents a better solution of the association problem.

The addresses provided by address generators AG1 and AG2 can be generated by random number generators, for example, or can be determined a priori and delivered in a random or a set sequence.

A new address pair ADZ1, ADZ2 is issued with each new cycle T. The addresses are generated in the relevant range (1. .. m) as a function of m, where m=max (number of rows (K), number of columns (K)). It is possible for defined deterministic address sequences, and the selection of $c\equiv 0$, to determine, as a function of the dimension m, after how many address pairs following the last activation of the signal ACCE further searching can be stopped. The number $N_{Add}$ of addresses, previously calculated, can be used for this purpose. Address counter AC is used for counting the address cycles, and indicates the end of the search process by activation of the REDY signal. The optimum allocation matrix Z is then read out of memory MEM1 by means of an issue request signal OutR.

As noted earlier, it is possible to considerably improve the effectiveness of the search if the starting point of the search, the start allocation matrix, already constitutes a relatively good solution of the association problem. The method which is to be used for determining the start allocation matrix should be adapted to the actual requirements.

Memory MEM1 for the allocation matrix can be designed so that the entire allocation matrix is stored as a binary matrix, i.e., of 1's and 0's. However, storage of a vector for the position of the 1 is another very efficient option. For each row of the allocation matrix, the column number in which the value 1 is located is stored as the vector. If there is no 1 in a row of the allocation matrix, "nil" is entered for this row in the vector for the position of the 1.

A simple choice for the threshold value is $c(T)\equiv 0$. In this case, c is constant and independent of the signals T, InR and ACCE. However, it may be advantageous for the search process, in the sense of a stochastic search process, to operate with $c(T)=c(t)\geq 0$, that is, where threshold value c is a function of time t. For this purpose, the threshold value $c(T)$ is reduced to zero in incremental steps, beginning with a defined positive starting value. The results may be improved when using this method variation, however, in general the searching process is simultaneously increased.

Thus, the method for determining solutions of the association problem, by means of which the allocation of observations with respect to objects in the course of multiple target tracking is performed, is characterized in that, based on any arbitrary allocation matrix, but one which is valid in the above-mentioned sense (i.e., a maximum of one value 1 in each column or row of the allocation matrix, but only the number of values 1 which corresponds to the smaller amount of elements to be compared), a more or less systematic search, or even a randomized search, for better solutions is made. The generation of new allocation matrices, as regards contents, takes place by the interchange of two arbitrary lines (either two rows or two columns) in the allocation matrix. However, the interchange in the memory of the allocation matrix actually only takes place if and when the signal ACCE becomes active, i.e., when the calculated quality difference is less than the predetermined threshold value c in the search. The determination of which line (rows or columns) of the allocation matrix are to be interchanged is made exclusively by address generators AG1, AG2.

Non-symmetrical association problems and problems with incomplete assignment can also be solved by the method presented. If the number of objects or measured values in the two groups is unequal, there is a rectangular distance matrix, and the solution is an allocation matrix of the same dimensions. A one, in this case, is no longer present in each row or column of the allocation matrix. These cases are also brought to a solution without limitations by the method presented, as long as there is exactly one value 1 in each column of the start allocation matrix. If this is not the case, this state must be brought about by transposing the distance and the start allocation matrices. The method can be directly used without modification by means of the conversion of the non-symmetrical into a symmetrical problem. But even slight modifications of the method make the direct solution of non-symmetrical association problems possible.

Something similar applies to association problems wherein, for example, because of too small a detection probability of the objects whose path, for example, is to be tracked, no complete assignment (allocation) is to be made. The possibility exists here to take this into account by a change in calculation of the start allocation matrix. The number of the values 1 in the allocation matrix is not changed during the search.

The actual distance matrix has an influence on the search through the solution space only to the extent that, on the one hand, the start allocation matrix depends on it and, on the other hand, newly tested allocation matrices are made the starting point of the further search in the case where the comparator CMP signals that the criteria $((K1+K2)-(K3+K4))<c$ has been met.

The process can be stopped anytime, for example, because of changing real-time requirements, and the possibly preliminary final result can be output anytime upon request (OutR). The signal REDY indicates in every case the end of the search, as long as a deterministic address generation process is used and a quality comparison value of $c=0$ is selected.

If a randomized method form is used, for example, with the coincidental generation of the start allocation matrix, different searches in general lead to different results. However, the more often searches are performed, the greater the probability of finding good solutions. The described method can be performed independently as often as desired, and carried out serially and/or in parallel fashion. The best result of the individual searches is the found solution.

The method may be implemented in various forms, e.g., in a digitally-oriented hardware implementation as in FIG. 2, for example, in a corresponding implementation in analog circuit technology, or analog computers, as well as in a software implementation in a digital computer, as would be readily apparent to one skilled in the art.

It will be understood that the above description of the present invention is susceptible to various modifications, changes and adaptations, and the same are intended to be comprehended within the meaning and range of equivalents of the appended claims.

What is claimed is:

1. A computer implemented method for automatic combinatory optimization of an association of individual predicted positions of objects as a first group with the individual actually observed positions of these objects as a second group, in a system for tracking several moving objects;

wherein one of these groups may have a smaller number of object positions than the other group;

wherein to each object position of the group with a smaller number of object positions, exactly one object position of the other group is allocated, and to each object position of a group with the larger number of object positions, no more than one object position of the other group is allocated;

wherein each individual allocation selects a distance value in a distance matrix corresponding to a squared distance between an actually observed position of an object and a predicted position of an object; and wherein the paired allocations are recorded in an allocation matrix having values of either 1 or 0, the number of 1's in the allocation matrix being no more than the number of object positions of the smaller of the groups, and wherein in every column and row of the allocation matrix, a 1 appears not more than once;

the method comprising:
   (A) using radar to obtain the actually observed positions;
   (B) generating any arbitrary matrix which is a valid start allocation matrix;
   (C) selecting two rows from the start allocation matrix and interchanging the respective 1's between corresponding columns in the rows creating a new allocation matrix;
   (D) forming a first sum using the two distance values which are located in the distance matrix corresponding to the two selected rows at the respective positions determined by the respective 1's before being interchanged;
   (E) forming a second sum using the two distance values which are located in the distance matrix corresponding to the two selected rows at the respective positions determined by the respective 1's after being interchanged;
   (F) forming a quality difference value as the difference between the first and second sums;
   (G) comparing the quality difference value with a predetermined threshold value;
   (H) using the new allocation matrix as a present valid allocation matrix if the quality difference value is less than the threshold value, but otherwise using the start allocation matrix as the present valid allocation matrix; and
   (I) repeating steps (C) to (H) until a predetermined period of time has elapsed, or until all interchange possibilities between two rows of the allocation matrix have been exhausted, or until after a set number of comparisons it being determined that no better allocation matrix has been found.

2. A method in accordance with claim 1, wherein the start allocation matrix is determined by means of an optimization method.

3. A method in accordance with claim 2, wherein a simplified closest neighbor method is used as the optimization method.

4. A method in accordance with claim 1, wherein the threshold value is incrementally lowered each time the process is repeated.

5. A method in accordance with one of claim 1, wherein the threshold value is set to zero.

6. In a system for tracking a plurality of moving objects, having a first group of values representing predicted positions of the objects and a second group of values representing actual observed positions of the objects, a distance matrix having distance values, and an allocation matrix in which a value of 1 represents a distance value in a corresponding row and column of the distance matrix and in which there is only a single 1 in a given row and column, a method of optimizing the allocation matrix comprising:

using radar to obtain the actual observed positions;
   storing an allocation matrix in a first memory as an initial valid allocation matrix;
   storing a distance matrix in a second memory, the distance values of the distance matrix being based on distances between the predicted positions of the objects and the actual observed positions of the objects;
   generating a first pair of addresses and providing them to the first and second memories;

outputting from the first memory a second pair of addresses in response to the first pair of addresses and providing the second pair of addresses to the second memory;

outputting from the second memory, distance values corresponding to the addresses provided to the second memory;

arithmetically combining the distance values output from the second memory to form a quality difference value;

comparing the quality difference value with a threshold value; and repeating the method from the generating a first pair of addresses step on with a new first pair of addresses if the quality difference value is not less than the threshold value; but if the quality difference value is less than the threshold value, then updating the allocation matrix in the first memory by interchanging rows or columns represented by the first pair of addresses, and repeating the method using the updated allocation matrix as the initial valid allocation matrix and a new first pair of addresses.

7. The method according to claim 6, further comprising generating an arbitrary initial valid allocation matrix.

8. The method according to claim 6, further comprising generating an initial valid allocation matrix according to a known optimization method.

9. The method according to claim 8, wherein the known optimization method is a simplified closest neighbor method.

10. An allocation matrix optimizing apparatus in a system for tracking a plurality of moving objects, comprising:

first memory means for storing an allocation matrix;

second memory means for storing a distance matrix, the distance matrix being formed from pairings of values from a first group of values representing previously calculated object positions and a second group of values representing actual observed object positions, the distance values representing the squared distance between the respective paired values;

wherein, in the allocation matrix, a value of 1 represents a distance value in a corresponding row and column of the distance matrix, there being only a single 1 in a given row and column of the allocation matrix;

first and second address generator means for generating first and second addresses, the first and second addresses each being provided to the first and second memory means;

wherein the first memory means outputs third addresses in response to the providing of the first and second addresses thereto, and provides the third addresses to the second memory means, and wherein the second memory means outputs distance values in response to the providing of the first, second and third addresses thereto;

arithmetic combining means for arithmetically combining the distance values output from the second memory means and producing a delta value, the arithmetic combining means comprising an adder;

threshold generator means for generating a threshold value; and comparing means for comparing the threshold value with the delta value and producing a comparison signal indicative of whether the delta value is less than the threshold value;

wherein if the comparison signal indicates the delta value is less than the threshold value, the allocation matrix in the first memory means is changed by interchanging rows or columns thereof corresponding to the first and second addresses.

11. The allocation matrix optimizing apparatus according to claim 10, further comprising start allocation matrix generator means for producing an initial valid allocation matrix and providing the initial valid allocation matrix to the first memory means.

12. The allocation matrix optimizing apparatus according to claim 11, wherein the start allocation matrix generator means produces the initial valid allocation matrix arbitrarily.

13. The allocation matrix optimizing apparatus according to claim 11, wherein the start allocation matrix generator means produces the initial valid allocation matrix by a known optimization method.

14. The allocation matrix optimizing apparatus according to claim 13, wherein the known optimization method is a simplified closest neighbor method.

15. The allocation matrix optimizing apparatus according to claim 10, further comprising address counter means for counting the number of addresses generated by the first and second address generator means up to a maximal number and issuing an end signal when the maximal number of addresses is reached, the address counter means being reset by the comparison signal which indicates the delta value is less than the threshold value; and cycle generator means for producing a cycle signal causing the first and second address generator means to cyclically produce addresses, the first and second address generator means producing new first and second addresses with each cycle signal of the cycle generator means.

16. The allocation matrix optimizing apparatus according to claim 10, wherein the threshold generator means includes threshold adjusting means for incrementally reducing the threshold value to a value not less than zero.

17. The allocation matrix optimizing apparatus according to claim 10, wherein the first and second address generator means generate random addresses.

* * * * *